United States Patent [19]

Takeuchi

[11] 4,184,083
[45] Jan. 15, 1980

[54] CLOSED LOOP ROTATIONAL SPEED CONTROL SYSTEM FOR GAS TURBINE ENGINE ELECTRIC GENERATOR

[75] Inventor: Tohru Takeuchi, Zushi, Japan

[73] Assignee: Nissan Motor Company, Limited, Yokohama, Japan

[21] Appl. No.: 900,865

[22] Filed: Apr. 28, 1978

[30] Foreign Application Priority Data

May 30, 1977 [JP] Japan ............................. 52-62976

[51] Int. Cl.² .......................... F02C 9/04; G05D 13/00
[52] U.S. Cl. ................................... 290/40 C; 290/14; 290/51; 322/18
[58] Field of Search ............... 290/14, 40 R, 40 A, 290/40 B, 40 C, 51, 52; 60/39.28 R; 322/18, 21, 22, 23

[56] References Cited

U.S. PATENT DOCUMENTS

| | | | |
|---|---|---|---|
| 3,198,954 | 8/1965 | Eggenberger et al. | 290/40 R |
| 3,621,370 | 11/1971 | Vandervort | 290/40 A X |
| 3,771,821 | 11/1973 | Rist et al. | 290/14 |
| 3,943,371 | 3/1976 | Yannone et al. | 290/40 B |
| 3,943,373 | 3/1976 | Yannone et al. | 290/40 R |

*Primary Examiner*—Gene Z. Rubinson
*Assistant Examiner*—W. E. Duncanson, Jr.
*Attorney, Agent, or Firm*—Schwartz, Jeffery, Schwaab, Mack, Blumenthal & Koch

[57] ABSTRACT

A load connection command signal is utilized to raise the rotational speed of a power turbine of an electric generator above a rated speed thereof while the same signal is used to connect load to the generator after a predetermined period of time. A load disconnection command signal is utilized to lower the rotational speed of the power turbine below the rated speed while the same signal is used to disconnect load from the generator with a time delay.

16 Claims, 6 Drawing Figures

CLOSED LOOP ROTATIONAL SPEED CONTROL SYSTEM FOR GAS TURBINE ENGINE ELECTRIC GENERATOR

FIELD OF THE INVENTION

The present invention generally relates to twinshaft gas turbine engines for generating electricity and more particularly to a speed control system of such gas turbine.

BACKGROUND OF THE INVENTION

Prime movers for driving a generator are subjected to the legal requirement that within a stipulated short period of time after interruption of services a predetermined electric voltage must be supplied.

Therefore, the prime movers for a generator must satisfy two requirements, one being that time required for start-up of prime mover be short enough to meet the above-mentioned legal requirement and, the other being that variation in rotational speed of a power turbine shaft of prime mover against load variations imposed on the power turbine shaft be small with a view for maintaining its output voltage frequencies constant.

It is well known that there are two types of gas turbines, i.e. a single-shaft type and a twin-shaft type.

Twin-shaft gas turbine engines are suitable as a prime mover for driving a generator in that start-up time is short enough to satisfy the first requirement because a compressor drive shaft is accelerated irrespectively of a power turbine shaft. However, since, in the twin-shaft gas turbine engines, inertia moment of a power turbine shaft is not great, there is a considerably large variation in rotational speed of the power turbine shaft against load variations imposed on the power turbine, whereby they fail to satisfy the second requirement.

In a known system, the rotational speed of the power turbine shaft is controlled by controlling the amount of fuel supplied to the combuster of the gas turbine. The fuel is controlled in accordance with a signal produced by detecting the difference between the rotational speed of the power turbine shaft and a reference signal representative of a rated or desired rotational speed. This kind of closed loop fuel control system works effectively when the variation of the rotational speed of the power turbine shaft occurs gradually or slowly. However, when the rotational speed of the power turbine shaft varies suddenly for instance when the load is connected or disconnected, abovementioned conventional type of closed loop fuel control system does not perform adequate feedback control and thus the rotational speed is apt to move out of an allowable range.

SUMMARY OF THE INVENTION

The present invention has been developed to overcome above mentioned drawbacks of the conventional type of gas turbine engines. According to the present invention, when connection of load to the electric generator driven by the turbine is required, a connection command signal is generated. This signal is used to increase the rotational speed of the turbine and is simultaneously fed to a delay circuit so that a predetermined time delay is achieved before the load is actually connected to the electric generator. This time delay is selected to allow the turbine speed to be raised approximately 7% before connection of the load. Upon disconnection of the load a disconnection command signal is generated. This signal is used to decrease the rotational speed of the turbine and is simultaneously fed to the delay circuit so that a predetermined time delay is achieved before the load is actually disconnected from the electric generator. This time delay is selected to allow the turbine speed to be lowered approximately 7% before disconnection of the load.

With this arrangement, the fluctuation of the rotational speed of the power turbine upon connection and disconnection of a load is considerably reduced.

It is therefore an object of the present invention to provide an improved closed loop rotational speed control system for twin-shaft gas turbine electric generator in which the fluctuation of the rotational speed of the power turbine is reduced.

Another object of the present invention is to provide such a system in which the fluctuation of the frequency of the generated electricity is reduced upon connection of load.

Still another object of the present invention is to provide such a system in which the magnitude of the overrun of the power turbine upon disconnection of load is decreased.

BRIEF DESCRIPTION OF THE DRAWINGS

Other features and advantages of the present invention will become more readily apparent from the following detailed description taken in conjunction with the accompanying drawings in which.

DETAILED DESCRIPTION OF THE PREFERRED EMBODIMENTS

Figure 1:
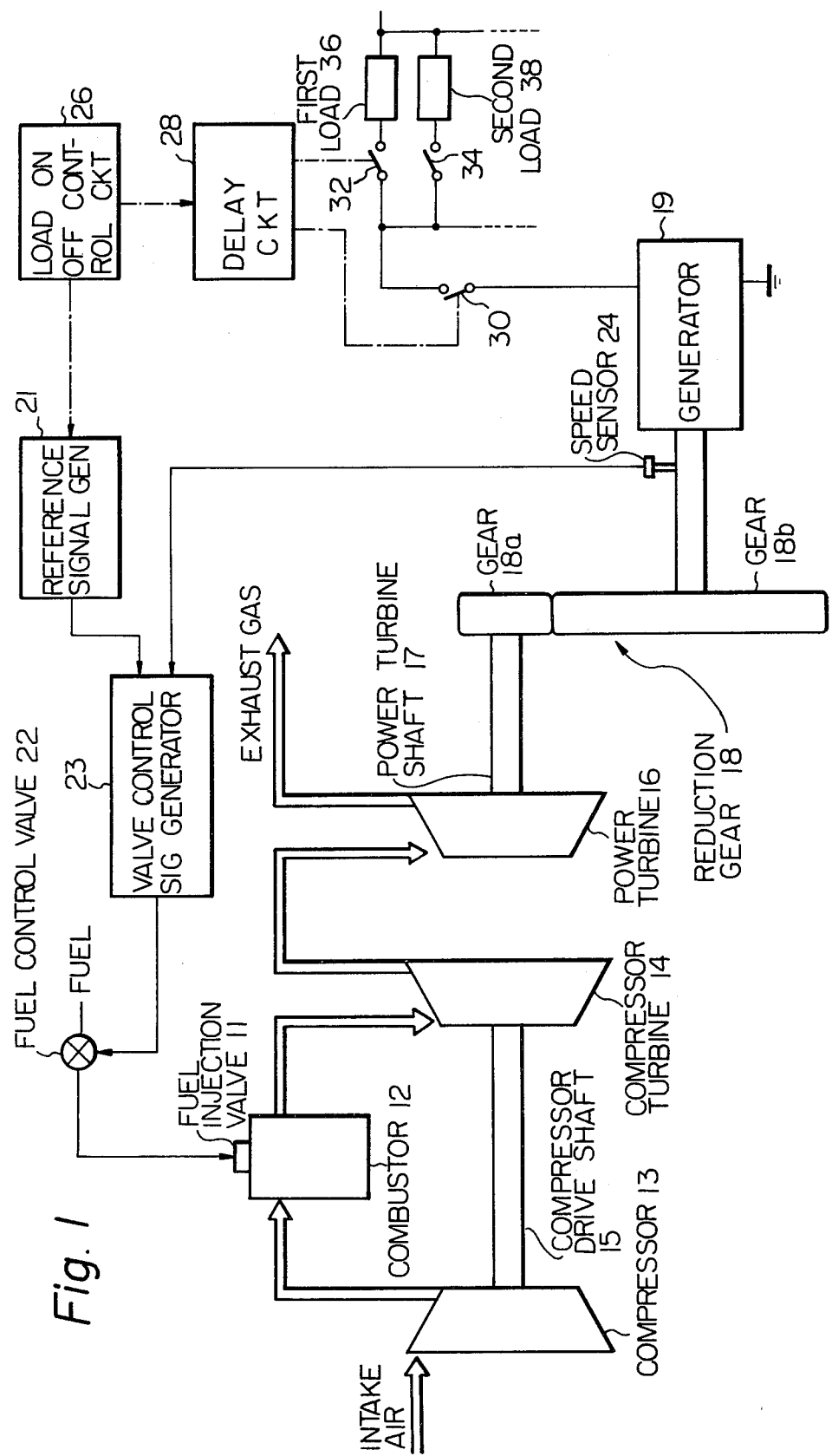
FIG. 1 shows in a schematic block diagram a closed loop rotational speed control system according to the present invention.

Reference is now made to FIG. 1, which shows a gas turbine engine equipped with a closed loop fuel control system according to the present invention. Fuel is supplied to a combustor 12 or a combustion chamber via a fuel control valve 22 and a fuel injection valve 11 while intake air is fed to the combustor 12 after compression in a compressor 13. High pressure and temperature combustion gas is produced in the combustor 12 and is directed against a compressor turbine 14 so as to rotate same. The rotation of the compressor turbine 14 is transmitted via a compressor drive shaft 15 to the compressor 13. The high temperature, pressurized gas applied to the compressor turbine 14 is then applied to a power turbine 16 to rotate same. The gas, after being applied to the power turbine, is exhausted to the atmosphere as an exhaust gas. A heat exchanger may be provided along an exhaust pipe (not shown).

The rotation of the power turbine 16 is transmitted via a power turbine shaft 17 and a suitable reduction gear 18, shown to include a small gear 18a and a large gear 18b, to a generator 19. A speed sensor 24 such as a tacho-generator or a pulse pick-up is provided to detect the rotational speed of the generator 19 and thus produces an output signal representative of the rotational speed. The output of the speed sensor 24 is supplied to a valve control signal generator 23. The valve control signal generator 23 is arranged to generate an output signal with which the fuel control valve 22 is controlled by comparing the magnitude of the output signal of the speed sensor 24 with a reference signal supplied to the valve control signal generator 23. Therefore the fuel control valve 22 controls the fuel flow rate in accordance with the detected rotational speed to maintain a predetermined rotational speed of the power turbine shaft 17.

In above-mentioned arrangement if the reference signal is constant, the closed loop fuel control system is the same as the conventional type. However, in the present invention the reference signal is produced in a reference signal generator 21 as shown in FIG. 1 and the reference signal varies in response to load connection and disconnection command signals.

An output of the generator 19 is connected via a main switch 30 and sub switches 32 and 34 to a first load 36 and a second load 38. If desired some other loads can be connected in parallel with the above mentioned series circuit of the sub switches 32 and 34 and first and second loads 36 and 38. The above-mentioned switches 30, 32 and 34 are not manual switches but contacts driven by respective relay circuits (not shown in FIG. 1 but in FIG. 2). These switches 30, 32 and 34 are controlled by a delay circuit 28 which is connected to a load ON-OFF control circuit 26.

Figure 2:
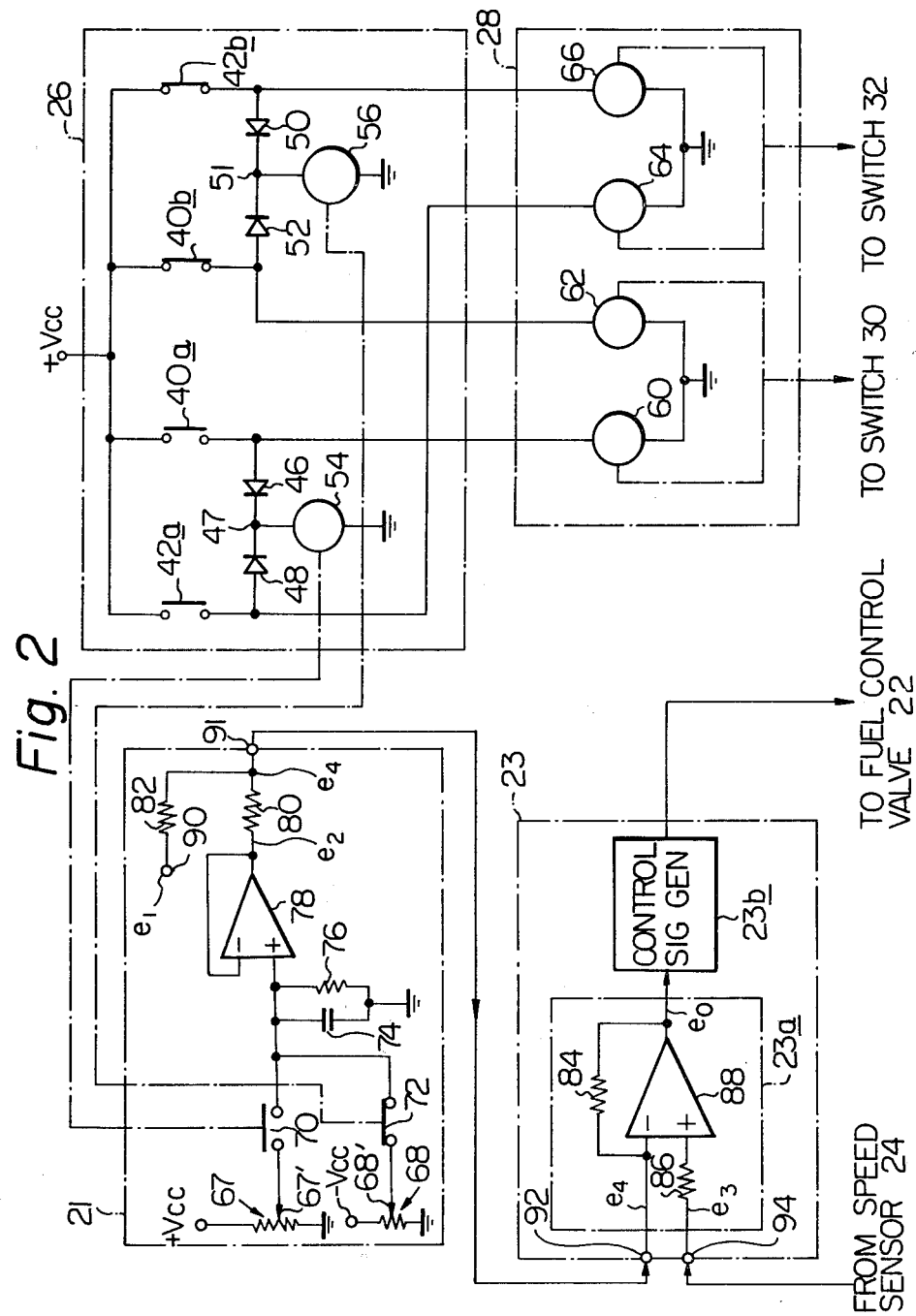
FIG. 2 shows detailed circuits of the load ON-OFF control circuit, the delay circuit, the reference signal generator and the valve control signal generator each shown in FIG. 1.

FIG. 2 illustrates detailed circuitry of the load ON-OFF control circuit 26, the delay circuit 28, the reference signal generator 21 and the valve control signal generator 23 all shown in FIG. 1.

The load ON-OFF control circuit 26 includes first, second, third and fourth switches 40a, 40b, 42a and 42b, four semiconductor diodes 46, 48, 50 and 52, and two relays 54 and 56. The first to fourth switches 40a, 40b, 42a and 42b may be either manual switches such as push-button type switches and gang switches or contacts of relays (not shown). If two gang switches are utilized, the first and second switches 40a and 40b are involved in one gang switch while the third and fourth switches 42a and 42b are involved in the other gang switch. If the first and second switches 40a and 40b are contacts of relays, the relays may be actuated upon an interruption of electric services. The first and second switches 40a and 40b correspond to the main switch 30 shown in FIG. 1, while the third and fourth switches 42a and 42b correspond to the sub switch 32. It is to be noted that the first and second switches 40a and 40b are operated either manually or automatically for connecting or disconnecting a whole load circuit which includes the sub switches 32 and 34 and first and second loads 36 and 38 while the third and fourth switches 42a and 42b are operated manually (if the third and fourth switches 42a and 42b are contacts of a relay, the relay is arranged to be controlled by a manual switch connected thereto) for connecting or disconnecting the first load 36 to the main switch 30.

The relays 54 and 56 are arranged to actuate for a predetermined period of time $\tau$ when an electric current is applied thereto either continuously or instantaneously. In order to arrange the relays to function in such a manner, the relays 54 and 56, respectively, include means such as a monostable multivibrator for supplying electric current for the predetermined period of time $\tau$.

One terminal of each of switches 40a, 40b, 42a and 42b is connected to a positive power supply +Vcc while the other terminal of each of these switches is connected to an anode of each diode 46, 52, 48 and 50. The cathodes of diodes 46 and 48 are connected to each other, while the cathodes of diodes 50 and 52 are connected to each other. A junction 47 between the cathodes of the diodes 46 and 48 is connected via a coil (not shown) included in a first relay 54 to ground while a junction 51 between the cathodes of the diodes 50 and 52 is connected via a coil (not shown) included in a second relay 56 to ground.

With this provision, upon closure of either the first switch 40a or the third switch 42a the first relay 54 is energized while the second relay is energized upon closure of either the second switch 40b or the fourth switch 42b. The function of these relays 54 and 56 will be described later.

The delay circuit 28 includes four relays 60, 62, 64 and 66. These relays 60, 62, 64 and 66 are delay relays which actuate after a predetermined period of time from the time of energization. One terminal of each coil of of each relays 60, 62, 64 and 66 is respectively connected to a terminal of one of the before mentioned first to fourth switches 40a, 40b, 42a and 42b while the other terminal of each coil of relays 60, 62, 64 and 66 is connected to ground. With this arrangement, each of the relays 60, 62, 64 and 66 is respectively energized upon closure of the corresponding switches 40a, 40b, 42a and 42b.

The reference signal generator 21 includes first and second potentiometers 67 and 68 which are respectively interposed between the positive power supply +Vcc and ground and a negative power supply −Vcc and ground. These potentiometers 67 and 68 can be substituted with two voltage dividers (not shown) which respectively include two resistors. A movable contact 67' is connected via a switch 70 to the noninverting input of an operational amplifier 78, while a movable contact 68' of the potentiometer 68 is also connected via a switch 72 to the noninverting input of the operational amplifier 78. A parallel circuit of a capacitor 74 and a resistor 76 is interposed between the noninverting input of the operational amplifier 78 and ground. The output of the operational amplifer 78 is connected to the inverting input of same so as to constitute a voltage follower circuit. The switches 70 and 72 are contacts of the first and second relays 54 and 56 included in the load ON-OFF control circuit 26. These switches 70 and 72 are arranged to close for a predetermined period of time, for instance from 0.5 sec to 1 sec, upon energization of corresponding first and second relays 54 and 56. The output of the operational amplifier 78 is connected via a resistor 80 to the output terminal 91 of the reference signal generator 21 while a resistor 82 is interposed between a reference signal terminal 90 and the output terminal 91. To the reference signal terminal 90 a predetermined voltage $e_1$ which may be produced by a suitable voltage divider (not shown), is applied so as to produce a voltage $e_4$ at the output terminal 91 by adding the predetermined reference voltage $e_1$ to the variable voltage $e_2$ produced at the output of the operational amplifier 78. This means that the resistors 80 and 82 function as an adder or a summing circuit. From the foregoing, the voltage $e_4$ is;

$$e_4 = e_1 + e_2$$

It is to be noted that the predetermined reference voltage $e_1$ corresponds to a rated rotational speed of the power turbine 16 or the generator 19 both shown in FIG. 1 while the voltage $e_2$, which assumes positive or negative voltages, corresponds to approximately 7% of the rated rotational speed. The output terminal 91 is connected to an input 92 of the valve control signal generator 23.

The valve control signal generator 23 includes a difference signal generator 23a or a subtracting circuit and a control signal generator 23b. The difference signal generator 23a includes two resistors 84 and 86, and an operational amplifier 88. An inverting input of the operational amplifer 88 is connected to the input terminal 92 while a noninverting input of same is connected via the resistor 86 to the other input terminal 94 to which a signal from the speed sensor 24 shown in FIG. 1 is applied. The other resistor 84 is a feedback resistor interposed between the output and the input of the operational amplifier 88.

The output of the operational amplifier 88 is connected to an input of the control signal generator 23b. The control signal generator 23b may constitute a P-I (proportional-integral) controller and an adding circuit, but not shown. The output of the control signal generator 23b is connected to the fuel control valve 22 shown in FIG. 1.

Figure 3:
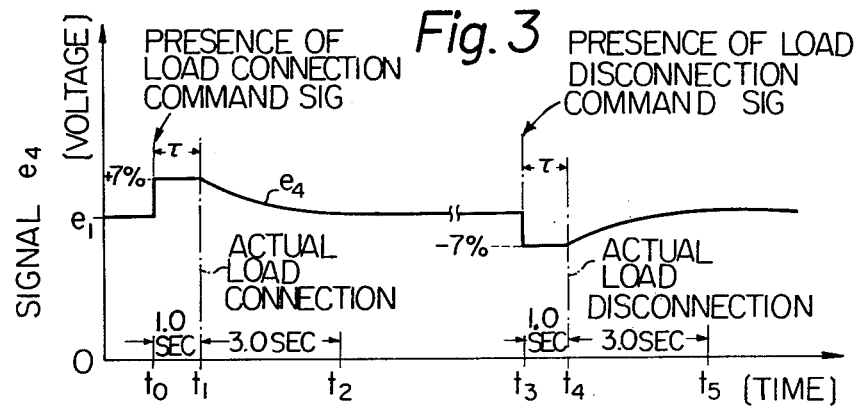
FIG. 3 shows the variation of the reference signal produced by the reference signal generator shown in FIG. 2.

Now the functions and operations of the circuitry shown in FIG. 2 will be described hereinbelow in conjunction with FIG. 3. When connection of load is required, the first switch 40a is actuated to be closed either instantaneously or continuously. Upon closure of the first switch 40a, the first relay 54 is simultaneously energized to close the switch 70 included in the reference signal generator 21 for the before-mentioned predetermined period of time $\tau$. Upon closure of the switch 70 a predetermined positive voltage produced by the potentiometer 67 is applied to the operational amplifier 78 so that the output voltage $e_2$ assumes a constant and predetermined positive voltage for the predetermined period of time while the capacitor 74 is charged. When the period of time $\tau$ is over, the switch 70 opens so that the charge stored in the capacitor 74 starts discharging through the resistor 76. As capacitor 74 discharges, the voltage at the noninverting input of the operational amplifier 78 decreases gradually so that the voltage $e_2$ decreases in the same manner, approaching 0 volt.

The output voltage $e_2$ of the operational amplifier 88 is added to the predetermined reference voltage $e_1$ so as to produce an output (added) voltage $e_4$ as mentioned before. The added voltage $e_4$ is then applied to the inverting input of the operational amplifier 88. Since the noninverting input of the operational amplifier 88 is supplied with the before mentioned signal, the voltage of which is $e_3$, indicative of the rotational speed of the generator 19 or the power turbine 16 both shown in FIG. 1, the operational amplifier 88 produces an output voltage $e_0$ by subtracting the voltage $e_4$ from the voltage $e_3$, i.e., the voltage $e_0$ is:

$$e_0 = e_3 - e_4 = e_3 - (e_1 + e_2)$$

It is to be noted that the above equation is possible only when the resistances of the resistors 80, 82, 84 and 86 are equal, for instance 100 k ohms.

The control signal generator 23b then produces an analog output signal, the magnitude of which is controlled in dependence of the output voltage $e_0$. Accordingly, the throat area of the fuel control valve 22 is controlled in response to the magnitude of the analog signal. Assuming that the switch 70 closes for a predetermined period of time upon connection of load, a positive output voltage $e_2$ is produced at the output of the operational amplifier 78 so that the voltage $e_4$ is above the predetermined reference voltage $e_1$ as shown in FIG. 3. This means that the voltage of the reference signal $e_4$ applied to the valve control signal generator 23 corresponds on a higher rotational speed than the rated speed. Consequently, the magnitude of the analog signal becomes greater than normal so that the fuel flow rate increases. After the predetermined period of time $\tau$, i.e., at time "$t_1$" the positive voltage $e_2$ starts decreasing until it becomes 0 volt so that the added voltage $e_4$ gradually decreases and approaches the predetermined reference voltage $e_1$. In this embodiment shown in FIG. 2 the time constant of the parallel circuit of the capacitor 74 and the resistor 76 is 3 seconds so that the added voltage $e_4$ assumes the predetermined reference voltage $e_1$ at time "$t_2$" which is 3 seconds after time "$t_1$".

Upon closure of the switch 72, i.e., upon disconnection of load, a negative output voltage $e_2$ is produced at the output terminal of the operational amplifier 78 so that the adder voltage $e_4$ is below the predetermined reference voltage $e_1$ for the predetermined period of time $\tau$. Thus the voltage control signal generator 23 produces an analog signal the magnitude of which is smaller than normal. This means the fuel flow rate decreases in an opposite manner with respect to the above-mentioned case of the increase thereof.

Turning back to the first switch 40a, upon closure of the first switch 40a the delay relay 60 in the delay circuit 28 is energized. However, because of the delay characteristic of the delay relay 60 the main switch 30 does not become conductive immediately but after a predetermined period of time. If the time delay of the delay relay 60 is equal to the beforementioned period of time $\tau$ for which the switch 70 is closed, the main switch 30 closes at time "$t_1$". With this arrangement the main switch 30 closes at time "$t_1$" irrespective of the states of the sub switches 32, 34.

The third and fourth switches 42a and 42b are provided to correspond with a sub switch 32 to which the first load 36 is connected. In the case that the first load 36 is considerably higher than the second load 38, the low load such as the second load 38 can be simultaneously connected to the output of the generator 19 when a connection command signal is produced since such a low load does not influence the rotational speed of the power turbine 16 shown in FIG. 1 to any extent.

Upon closure of the third switch 42a the first relay 54 is energized in the same manner as described hereinabove so that the valve control signal generator 23 produces the same output signal as that produced upon closure of the first switch 40a. Since the third switch 42a is connected to the delay relay 64, the delay relay 64 renders switch 32 closed with a predetermined time delay. The reason why such a sub switch 32 and corresponding switches 42a and 42b are provided i to provide a time delay in connection of the first load 36 when the main switch 30 is in a closed state. It is to be noted that the time delay for the sub switch 32 is useful in the case where the main switch 30 closes while the sub switch 32 is open, since it would otherwise be impossible to provide any time delay before connection of the first load 36.

The above described functions and operations of the circuitry shown in FIG. 2 are only for the connection of load. Hereinbelow, the functions and operations of the same circuitry for the disconnection of load will be described. When the electric service is re-established after the interruption, the second switch 40b closes at time "$t_3$" so that the second relay 56 is energized simultaneously. Since the second relay 56 corresponds to the switch 72 included in the reference signal generator 21, the switch 72 closes upon closure of the second switch 40b. Therefore, a negative predetermined voltage produced by the potentiometer 68 is fed to the noninverting input of the operational amplifier 78 as well as to the parallel circuit of the capacitor 74 and the resistor 76. The switch 72 is so constructed as to be ON for a predetermined period of time $\tau$ similarly to switch 70, so that the negative predetermined voltage is applied to the operational amplifier 78 for the predetermined period of time $\tau$ while the capacitor 74 is charged. After the predetermined period of time $\tau$ is over, the switch 72 opens so that the charge stored in the capacitor 74 is discharged through the resistor 76. Therefore, the voltage $e_2$ at the output of the operational amplifier 78 increases gradually until the voltage $e_2$ reaches 0 volt. The output voltage $e_4$ is thus produced in response to the variation of the voltage $e_2$. With this arrangement, the output voltage $e_4$ is below the predetermined reference voltage $e_1$ for a period of time $\tau$ and approaches the predetermined reference voltage $e_1$ from time "$t_4$" and reaches same at time "$t_5$".

Since the output voltage $e_4$ of the reference signal generator 21 corresponds to a lower rotational speed than the rated speed and is supplied to the valve control signal generator 23 in the same manner as in the previous case, the valve control signal generator 23 produces an output signal with which the fuel flow rate is decreased.

Turning back to the second switch 40b, upon closure of same the delay relay 62 included in the delay circuit 28 is energized and thus the main switch 30 shown in FIG. 1 opens after a time delay. If the time delay is the same as the period of time $\tau$ for which the switch 72 closes, the main switch 30 opens at time "$t_4$" as shown in FIG. 3. The fourth switch 42b closes when the operator intends to disconnect the first load 36 from the generator 19. Upon closure of the fourth switch 42b, the second relay 56 is energized in the same manner as described above. Consequently, an output signal with which the fuel flow rate decreases, is produced upon closure of either the second switch 40b or the fourth switch 42b. The delay relay 66 is energized upon closure of the switch 42b and thus the sub switch 32 opens after a predetermined period of time in the same manner as in the previous case.

Figure 4:
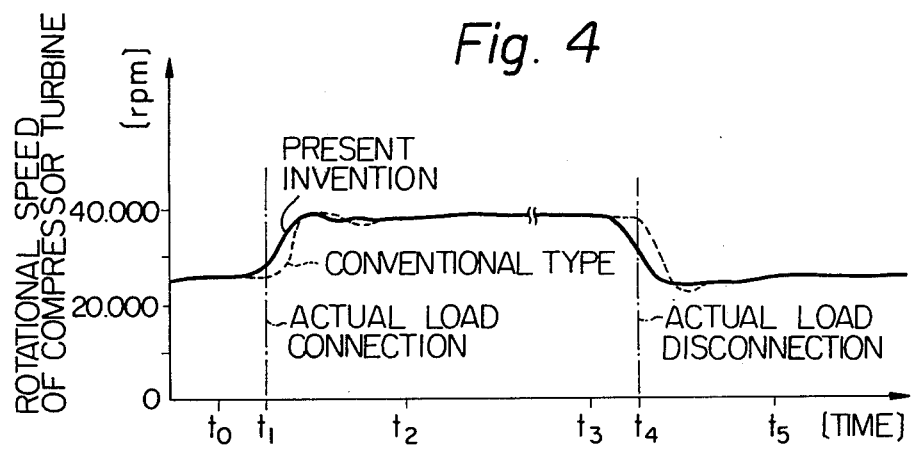
FIG. 4 shows the variation of the rotational speed of the compressor drive shaft shown in FIG. 1.
Figure 5:
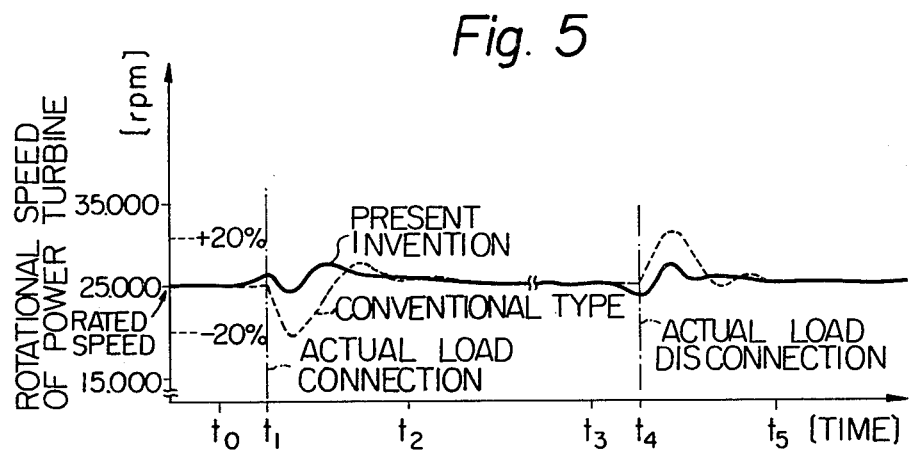
FIG. 5 shows the variation of the rotational speed of the power turbine shaft shown in FIG. 1.

FIG. 4 and FIG. 5 respectively illustrate the rotational speeds of the compressor turbine 14 and the power turbine 16. In these figures, dotted lines indicate rotational speeds of same of the conventional type of the gas turbine engine generator, i.e., a gas turbine engine generator without a delay circuit and a reference signal generator such as those shown in FIGS. 1 and 2, while solid lines indicate the rotational speeds of same according to the present invention.

As shown in FIG. 4 and FIG. 5, the rotational speeds of the compressor turbine and the power turbine are raised before the time "$t_1$" at which the load is actually connected. In the same manner the rotational speeds are lowered before the time "$t_4$" at which the load is disconnected. With this arrangement, the fluctuation of the rotational speed of the power turbine is considerably reduced as compared with that of the conventional type as clearly indicated. This means that the fluctuation of the frequency of the electricity produced by the generator 19 is reduced, especially at the initial period of time of the connection of load, while the magnitude of the overrun of the power turbine 16 is also reduced at the initial period of time of the disconnection of load.

Figure 6:
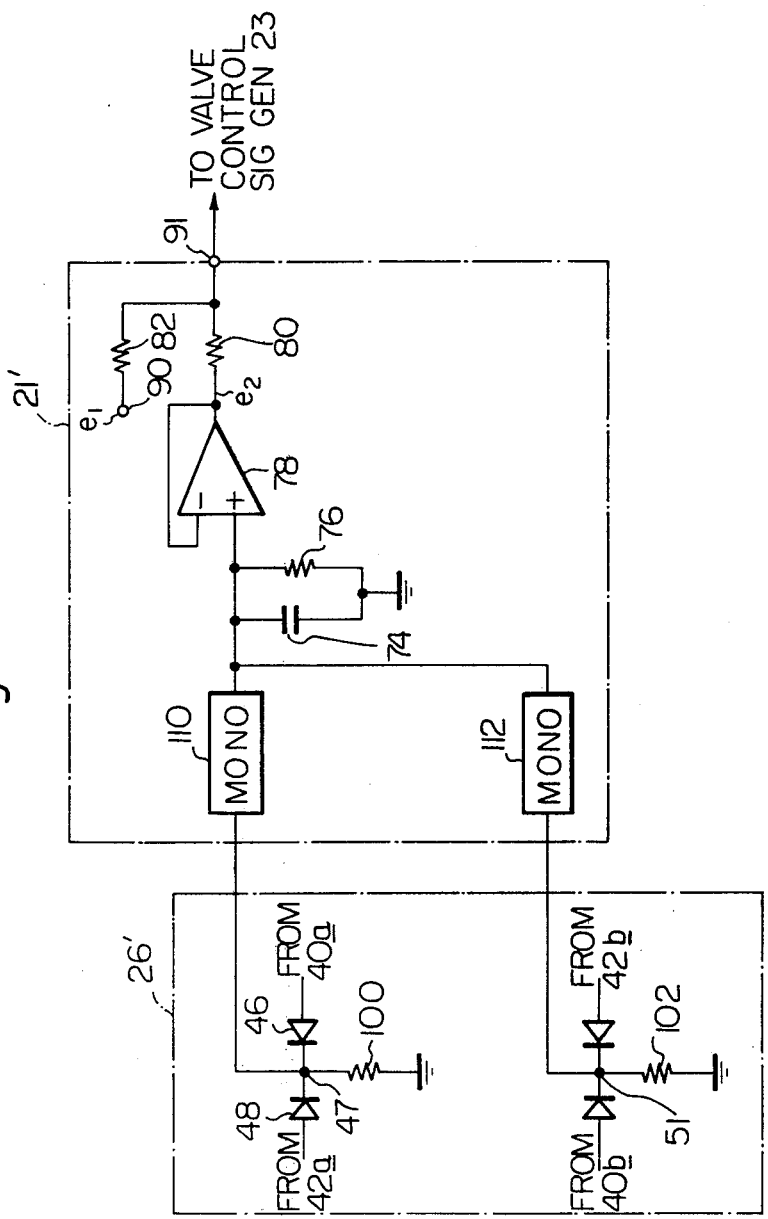
FIG. 6 shows in detail another possible circuit arrangement of the load ON-OFF control circuit, the reference signal generator and the valve control signal generator each shown in FIG. 1.

FIG. 6 illustrates an another embodiment of the circuitry of the load ON-OFF control circuit 26 and the reference signal generator 1, both shown in FIG. 1. The circuitry shown in FIG. 6 is same in construction as that shown in FIG. 2 except that first and second relays 54 and 56 and the two combinations of the potentiometer 67 and switch 70, and the potentiometer 68 and the switch 72 are respectively substituted with resistors 100 and 102 and monostable multivibrators 110 and 112. Corresponding elements are designated by like reference numerals as in FIG. 2. The junction 47 is connected to an input of a first monostable multivibrator 110, the output of which is connected to the noninverting input of the operational amplifier 78, while the other junction 51 is connected to the input of the second monostable multivibrator 112, the output of which is connected to the noninverting input of the same operational amplifier 78. The first monostable multivibrator 110 is arranged to produce a positive pulse, the pulse width of which is determined by the time constant of the elements included therein, when a trigger signal is applied to the input thereof. The second monostable multivibrator 112 is arranged to produce a negative pulse, the pulse width of which is determined in the same manner, when a trigger signal is applied to the input thereof.

When one of the first and third switches 40a and 42a closes, an electric current flows, via one of the diodes 46 and 48 and the resistor 100, to ground so that a voltage at the junction 47 increases abruptly to trigger the first monostable multivibrator 110. Since the first monostable multivibrator 110 produces a positive output pulse, the first monostable multivibrator 110 functions in the same manner as the combination of the potentiometer 67 and the switch 70 shown in FIG. 2. The second monostable multivibrator 112 is triggered in the same manner at the initial time "$t_3$" of the closure of one of the second and fourth switches 40b and 42b and thus the second monostable multivibrator 112 functions in the same manner as the combination of the potentiometer 68 and the switch 72 shown in FIG. 2. The pulse widths of the positive and negative pulses are so selected that an adequate period of time for stabilization of the rotational speed of the compressor turbine 14 and the power turbine 16, is provided.

Although the description is given above in conjunction with a twin-shaft-type gas-turbine-engine generator, the concept of the invention may be employed for a single-shaft-type gas-turbine-engine generator and other prime movers such as diesel engines with a turbo-supercharger.

What is claimed is:

1. A closed loop rotational speed control system for a prime mover of an electric generator, said system including, a fuel control valve for controlling the fuel flow rate to be supplied to the prime mover for regulating the rotational speed of said prime mover; a rotational speed sensor for producing a signal indicative of the rotational speed of the prime mover; and a valve control signal generator for generating a control signal with which the fuel control valve is controlled, by comparing the magnitude of the signal indicative of the rotational speed and a reference signal the magnitude of which normally corresponds to a rated rotational speed; wherein the improvement comprises:

(a) load ON-OFF control means for producing load connection and disconnection command signals;

(b) a reference signal generator connected to said load ON-OFF control means for producing said reference signal, said reference signal assuming a level corresponding to a higher level that the rated rotational speed for a predetermined period of time upon presence of said load connection command signal, said reference signal assuming a level corresponding to a lower level than the rated rotational speed for a predetermined period of time upon presence of said load disconnection command signal;

(c) load ON-OFF switching means interposed between the output of said electric generator and load for connecting and disconnecting the load to said electric generator; and (d) a delay circuit connected to said load ON-OFF control means for controlling said load ON-OFF switching means in response to said load connection and disconnection command signals.

2. A system as claimed in claim 1, wherein said reference signal generator comprises;

(a) predetermined voltage supply means for producing a predetermined voltage which corresponds to the rated rotational speed;

(b) positive predetermined voltage supply means;

(c) negative predetermined voltage supply means;

(d) switching means for selectively supplying one of said positive and negative predetermined voltages in response to said load connection and disconnection command signals;

(e) an adder connected to said predetermined voltage supply means and to said switching means for modifying said predetermined voltage with one of said positive and negative voltages to produce two kinds of output signals which respectively correspond to higher and lower rotational speeds than said rated rotational speed.

3. A system as claimed in claim 2, wherein said reference signal generator further comprises charge-discharge means interposed between said switching means and said adder for continuously varying the selectively supplied voltage after said switching means becomes nonconductive until the voltage across said charge-discharge means becomes zero volt.

4. A system as claimed in claim 3, wherein said charge-discharge means comprises a parallel circuit of a capacitor and a resistor interposed between the output of said switching means and ground.

5. A system as claimed in claim 2, wherein said positive and negative predetermined voltage supply means are voltage dividers.

6. A system as claimed in claim 2, wherein said switching means are contacts of relays which are arranged to be respectively driven by said load connection and disconnection command signals for a predetermined period of time.

7. A system as claimed in claim 3, wherein said reference signal generator further comprises a voltage follower circuit interposed between said charge-discharge means and said adder.

8. A system as claimed in claim 1, wherein said reference signal generator comprises;

(a) predetermined voltage supply means for producing a predetermined voltage which corresponds to the rated rotational speed;

(b) first monostable multivibrator for producing a positive predetermined voltage for a predetermined period of time, said first monostable multivibrator being triggered in response to said load connection command signal;

(c) second monostable multivibrator for producing a negative predetermined voltage for a predetermined period of time, said second monostable multivibrator being triggered in response to said load disconnection command signal;

(d) an adder connected to said predetermined voltage supply means and to said first and second monostable multivibrators for modifying said predetermined voltage with one of said positive and negative voltages to produce two kinds of output signals corresponding respectively to higher and lower rotational speeds than said rated speed.

9. A system as claimed in claim 8, wherein said reference signal generator further comprises a charge-discharge means interposed between said first and second monostable multivibrators and said adder.

10. A system as claimed in claim 9, wherein said reference signal generator further comprises a voltage follower circuit interposed between said charge-discharging means and said adder.

11. A system as claimed in claim 1, wherein said load ON-OFF control means comprises switching means.

12. A system as claimed in claim 11, wherein said switching means comprises a relay arranged to be operated upon the interruption of electric services and the reestablishment of same.

13. A system as claimed in claim 11, wherein said switching means comprises a gang switch arranged to be operated manually.

14. A system as claimed in claim 11, wherein said switching means comprises first and second push-buton type switches arranged to be operated manually.

15. A system as claimed in claim 1, wherein said load ON-OFF control means comprises first and second switching means;

wherein said load ON-OFF switching means comprises third switching means and a plurality of fourth switching means, said plurality of fourth switching means being respectively connected to corresponding load at one terminal thereof and being connected to one terminal of said third switching means at the other terminals thereof, the other terminal of said third switching means being connected to the output of said electric generator, said first switching means producing first load connection and disconnection command signals while said second switching means produces second load connection and disconnection command signals; and wherein said delay circuit comprises first and second delay circuits respectively connected to said first and second switching means, said third switching means being arranged to be actuated via said first delay circuit in response to said first command signals for connecting and disconnecting said fourth switching means to the output of said electric generator, at least one of said fourth switching means arranged to be actuated via said second delay circuit in response to said second command signals for connecting and disconnecting corresponding load to said third switching means, the remainder of said fourth switching means being actuated manually for connecting and disconnecting corresponding load to said third switching means.

16. A system as claimed in claim 1, wherein said delay circuit comprises at least one delay relay.

* * * * *